(12) United States Patent  (10) Patent No.: US 7,213,229 B2
Stevens et al.  (45) Date of Patent: May 1, 2007

(54) CONTENT-BASED GRAPHICAL USER INTERFACE

(75) Inventors: Randall S. Stevens, Lexington, KY (US); Nathaniel McConathy, Lexington, KY (US); Christopher A. Wells, Lexington, KY (US)

(73) Assignee: ArchVision, Inc., Lexington, KY (US)

( * ) Notice: Subject to any disclaimer, the term of this patent is extended or adjusted under 35 U.S.C. 154(b) by 392 days.

(21) Appl. No.: 10/376,175

(22) Filed: Feb. 28, 2003

(65) Prior Publication Data

US 2004/0169680 A1 Sep. 2, 2004

(51) Int. Cl.
G06F 9/44 (2006.01)
G06F 3/00 (2006.01)

(52) U.S. Cl. .............. 717/110; 717/109; 717/111; 717/113; 715/788; 715/798; 715/815

(58) Field of Classification Search ............... 717/106, 717/109–164; 715/746–781, 788–815; 345/744–859
See application file for complete search history.

(56) References Cited

U.S. PATENT DOCUMENTS

| | | | |
|---|---|---|---|
| 5,396,590 A | 3/1995 | Kreegar | |
| 5,513,303 A | 4/1996 | Robertson et al. | |
| 5,515,496 A | 5/1996 | Kaehler | |
| 5,588,098 A | 12/1996 | Chen et al. | |
| 5,619,628 A | 4/1997 | Fujita et al. | |
| 5,894,310 A | 4/1999 | Arsenault et al. | |
| 6,108,010 A | 8/2000 | Boezeman et al. | |
| 6,918,093 B2 * | 7/2005 | Broussard | 715/781 |
| 2002/0075332 A1 * | 6/2002 | Geilfuss et al. | 345/859 |
| 2002/0180783 A1 * | 12/2002 | Broussard | 345/744 |
| 2005/0246644 A1 * | 11/2005 | Broussard | 715/746 |

* cited by examiner

*Primary Examiner*—Kakali Chaki
*Assistant Examiner*—Mark P. Francis
(74) *Attorney, Agent, or Firm*—Dinsmore & Shohl LLP

(57) ABSTRACT

A computer program, computer-readable media and data signal for providing a content-specific graphic user interface each includes a plurality of code segments for rendering a user interface having at least one graphic manipulation icon, said at least one graphic manipulation icon being operatively associated with at least one attribute of the graphic image for manipulation of said at least one attribute by a user. A method and system for using core functions from a host application to provide a content-specific graphical image manipulation interface is also disclosed.

40 Claims, 5 Drawing Sheets

CONTENT-BASED GRAPHICAL USER INTERFACE

BACKGROUND OF THE INVENTION

The present invention relates broadly to computer software for graphical representations of physical objects and, more particularly, to a user interface for graphical image applications having user controls based on graphical content.

Professional software applications, in the area of graphics and other fields, generally provide users with access to a task-specific set of functions to create and edit content. Accordingly, the graphic user interface (GUI) provides an interface with end-user to interact with functions inherent in the application. Developers may use a menu system designed around core functions provided by the host application. The core functions can include basic movement functions such as rotate and appearance functions, such as those defining texture.

Often in the area of computer graphics, external image data is imported into a host application to create a composite image formed from the external image data and the image generated by the host application. For example, a graphic image could be imported into a host application containing a separate image to create a composite image with the host application providing a background for the newly imported data. In this case, the process of editing content can be complex, often requiring multiple steps to accomplish what appear to be simple tasks. A fundamental problem with prior user interfaces is the requirement that basic or fundamental editing functions are required to create and edit content. The result is that users are required to address content editing in terms of the basic language used to manipulate objects within the host application. The ultimate result is often increased learning periods and inefficient use of the users time in performing multiple tasks to accomplish simple high-level content-specific tasks.

For example, a graphics program might illustrate a room containing several adjustable chairs and a desk. If the designer wanted to adjust a chair within the image, a complex series of instructions on a generic level could accomplish the task. These instructions may include scaling, rotation or other generic movements that are non-specific to the item depicted in the image.

Production work flow and quality can be improved by providing a graphic user interface that includes menu driven commands that are content-specific, i.e. dedicated to the content of the image. In the example above, a content-specific menu might provide adjustment of the chair with commands such as "swiveling" and "elevation". These simple commands would cause movement of the chair within the image without the time and mental effort required to move the chair based on fundamental commands.

SUMMARY OF THE INVENTION

It is accordingly an object of the present invention to provide a graphical user interface that utilizes functions in a host application to provide image attribute adjustments based on a specific attribute of a specific image.

It is another object of the present invention to provide such an interface wherein the adjustments are intuitive to a user based on the appearance of the image attribute.

To those ends, the present invention is described herein in several preferred embodiments, each one equally effective in setting forth the present invention. Accordingly, the present invention is directed to a computer program embodied on a computer-readable media for providing a content-specific graphic user interface including a plurality of code segments for rendering a user interface having at least one graphic manipulation icon, with the at least one graphic manipulation icon being operatively associated with at least one attribute of the graphic image for manipulation of the at least one attribute by a user.

Preferably, the plurality of code segments includes a code segment defining graphical content for use by a host application to display a predetermined graphical image. It is further preferred that the plurality of code segments further includes a code segment defining an application program interface for use in forming a set of data manipulation functions to implement in the host application for selective image manipulation, the data manipulation functions being based on the core functions of the host application. The plurality of code segments may also include a content code segment defining functions for data manipulation of the graphical content to alter the appearance of the graphic image displayed on a screen, thereby forming data manipulation functions, with the data manipulation functions being based on the graphical image content and implemented using the core functions.

It is further preferred that the plurality of code segments includes a code segment cooperative with an input device to receive an input for image manipulation, and to cause the content code segment to apply the data manipulation functions to manipulate a graphical image on a display through the host application with the data manipulation functions using the core functions of the host application. The core functions can include transforms, material properties, RGB intensity, textures, opacity and other aspects of the image. It is preferable that the data manipulation functions are defined based on the core functions and stored with predetermined image components in operative association with the code segment defining graphical content. Further, the predetermined image components may also include predetermined image sub-components and a plurality of the sub-components are used to form compound image components. It is preferred that the data manipulation functions are assigned to one of a series of content-specific graphic user interface functions, thereby creating a compound graphic user interface to be displayed within a host application.

The present invention may also be described as a computer program embodied on a computer-readable media for providing a content-specific graphic user interface having a code segment defining graphical content for use by a host application to display a predetermined graphical image; a code segment defining an application program interface for use in forming a set of data manipulation functions to implement in the host application for selective image manipulation, the data manipulation functions being based on the core functions of the host application; a code segment defining functions for data manipulation of the graphical content to alter the appearance of the graphic image displayed on a screen, thereby forming data manipulation functions, the data manipulation functions being based on the graphical image content and implemented using the core functions; and a code segment cooperative with an input device to receive an input for image data manipulation, and to cause the code segment defining graphical content to apply the data manipulation functions to manipulate a graphical image on a display through the host application with the data manipulation functions using the core functions of the host application.

It is preferable that the data manipulation functions are defined based on the core functions and stored with predetermined image components in operative association with the content code segment. Preferably, the predetermined image components also include predetermined image sub-components and a plurality of the sub-components are used to form compound image components. It is further preferred that the data manipulation functions are assigned to one of a series of content-specific graphic user interface functions, thereby creating a compound graphic user interface to be displayed within a host application.

According to another embodiment, the present invention is directed to a computer data signal embodied in a carrier wave including computer-executable instructions for rendering a user interface having at least one graphic manipulation icon. The at least one graphic manipulation icon is operatively associated with at least one attribute of the graphic image for manipulation of the at least one attribute by a user.

It is preferred that the computer-executable instructions include a code segment defining graphical content for use by a host application to display a predetermined graphical image. It is further preferred that the computer-executable instructions further include a code segment defining an application program interface for use in forming a set of data manipulation functions to implement in the host application for selective image manipulation, the data manipulation functions being based on the core functions of the host application. Preferably, the computer-executable instructions include a code segment defining functions for data manipulation of the graphical content to alter the appearance of the graphic image displayed on a screen, thereby forming data manipulation functions, the data manipulation functions being based on the graphical image content and implemented using the core instructions. It is further preferred that the computer-executable instructions include a code segment cooperative with an input device to receive an input for image manipulation, and to cause the content code segment to apply the data manipulation functions to manipulate a graphical image on a display through the host application with the data manipulation functions using the core functions and the host application.

It is preferable that the data manipulation functions are defined based on the core functions and stored with predetermined image components in association with the code segment defining graphical content. Further, the predetermined image components may also include predetermined image sub-components and a plurality of the sub-components are used to form compound components. The data manipulation functions may be assigned to one of a series of content-specific graphic user interface functions, thereby creating a compound graphic user interface to be displayed within a host application.

The present invention may also be described as a computer data signal embodied in a carrier wave including a code segment defining graphical content for use by a host application to display a predetermined graphical image; a code segment defining an application program interface for use in forming a set of data manipulation functions to implement in the host application for selective image manipulation, the data manipulation functions being based on the core functions of the host application; a code segment defining functions for data manipulation of the graphical content to alter the appearance of the graphic image displayed on a screen, thereby forming data manipulation functions the data manipulation functions being based on the graphical image content and implemented using the core functions; and a code segment cooperative with an input device to receive an input for image manipulation, and to cause the code segment defining graphical content to apply the data manipulation functions to manipulate a graphical image on a display through the host application with the data manipulation functions using the core functions and the host application.

The data manipulation functions may be defined based on the core functions and stored with predetermined image components in operational association with the code segment defining graphical content. The predetermined image components may also include predetermined image sub-components and a plurality of the sub-components are used to form compound image components. Further, the data manipulation functions may be assigned to one of a series of content-specific graphic user interface functions, thereby creating a compound graphic user interface to be displayed within a host application.

According to another embodiment, the present invention is directed to a computer-readable media storing computer-executable instructions for providing a content-specific graphic user interface computer application. Here, the computer-readable media includes computer-executable instructions for rendering a user interface having at least one graphic manipulation icon, the at least one graphic manipulation icon being operatively associated with at least one attribute of the graphic image for manipulation of the at least one attribute by a user.

It is preferred that the computer-executable instructions include a code segment defining graphical content for use by a host application to display a predetermined graphical image. It is further preferred that the computer-executable instructions include a code segment defining an application program interface for use in forming a set of data manipulation functions to implement in the host application for selective image manipulation, the data manipulation functions being based on the core functions of the host application.

Preferably, the computer-executable instructions include a code segment defining functions for data manipulation of the graphical content to alter the appearance of the graphic image displayed on a screen, thereby forming data manipulation functions, the data manipulation functions being based on the graphical image content and implemented using the core instructions. It is further preferred that the computer-executable instructions include a code segment cooperative with an input device to receive an input for image manipulation, and to cause the content code segment to apply the data manipulation functions to manipulate a graphical image on a display through the host application with the data manipulation functions using the core functions and the host application.

Preferentially, the data manipulation functions are defined based on the core functions and stored with predetermined image components in operative association with the code segment defining graphical content. The predetermined image components may also include predetermined image sub-components and a plurality of the sub-components are used to form compound image components. Further, the data manipulation functions may be assigned to one of a series of content-specific graphic user interface functions, thereby creating a compound graphic user interface to be displayed within a host application.

The present invention is also directed to a method for using core functions associated with a host application to provide a graphical user interface that is content-specific. In this embodiment, the present invention is directed to a multi-step method for using core functions of a host application to provide a content-specific graphical image manipulation interface comprising steps of:
(1) providing an application program interface code segment for interaction with a host application;
(2) providing a graphical content segment for interaction with the application program interface code segment and to provide at least one graphical element;
(3) using said application program interface code segment to form a set of data manipulation functions to implement in the host application for selective image manipulation, the data manipulation functions being based on the core functions of the host application and the content of the at least one graphical image; and
(4) assigning each function to one of a plurality of content-specific graphic user interface operations thereby creating a content-specific graphic user interface for display by the host application.

It is preferred that the step of defining a set of data manipulation functions includes storing the set of data manipulation functions with predetermined image components in operational association with the code segment defining graphical content. Preferentially, the step of defining a set of data manipulation functions includes storing the set of data manipulation functions wherein the predetermined image components also include predetermined image sub-components and a plurality of the sub-components are used to form compound image components.

DESCRIPTION OF THE PREFERRED EMBODIMENT

Figure 1:
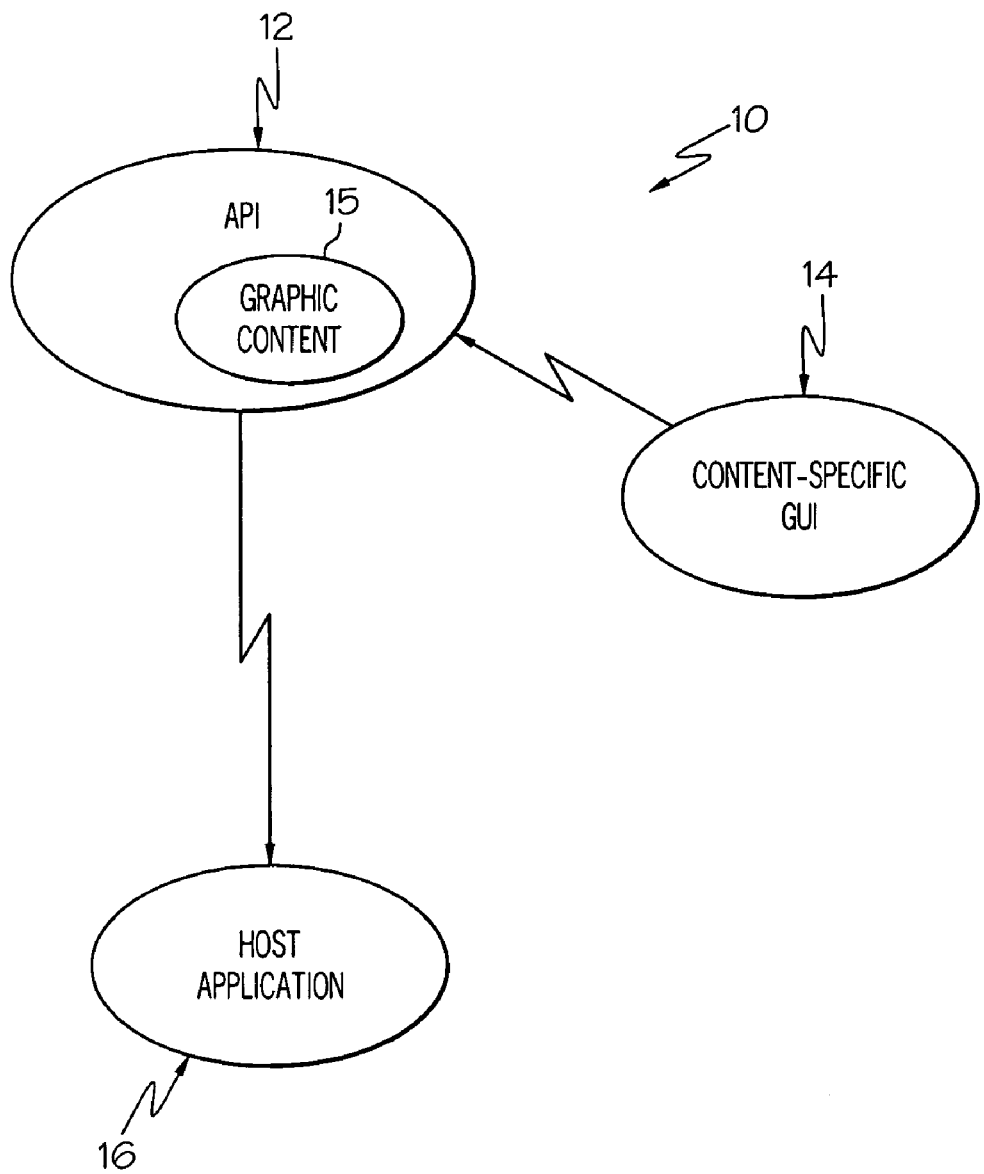
FIG. 1 is a diagrammatic representation of a Graphic User Interface according to the preferred embodiment of the present invention.

A general diagram is provided as FIG. 1 to place the present invention and to its context within the host application and its associated environment. As previously mentioned, host application may be any form of graphic presentation application and, more particularly, the host application may be an application, that provides architects with the ability fill virtual space with their designs.

A typical host application will have a number of core functions that can control various aspects of an image presented on the screen. In a 3-D graphics application, the core functions would typically include transforms such as move, rotate and scaling functions in addition to material properties functions such as texture maps, RBG (color), intensity and opacity. Each of these functions may be controlled by the computer user to manipulate components of the overall image. One of the problems with this sort of image control is that the core functions do not translate to intuitive movement commands with respect to an object within the image field. For example, in order to perform a simple task such as opening a desk drawer or moving a chair within the image, several arcane and complex commands may be required. Further, the necessary core functions to perform the movement are not necessarily apparent to the user of the graphic software. Such simple movements can provide a disruption of the design process and make it more difficult for the user of the graphic application to perform his or her workday task, which is not computer manipulation, but rather architecture or other graphic design endeavor.

In order to address and provide a solution to this problem, the present invention provides menu-driven data manipulation functions that have been pre-associated with the core functions before a graphic designer or other end user uses the application. It would be preferable that the data manipulation functions that cause movement of the sub-components within the image were in some way associated with the content of the image on an intuitive or human level. For example, regarding the aforesaid desk, the computer user could call a menu wherein the menu provides button icons for opening the desk drawer or any other type of function causing movement of components within the overall image.

In this case, the present invention provides menu-driven operations that use intuitive commands. For example, a "button" icon on the menu might indicate "open desk drawer" and "close desk drawer." Alternately, the command could be given by a slider icon. The menu controls are operationally associated with the host application core functions to perform the necessary combination of core functions to accomplish the task set forth on the control menu.

Figure 5:
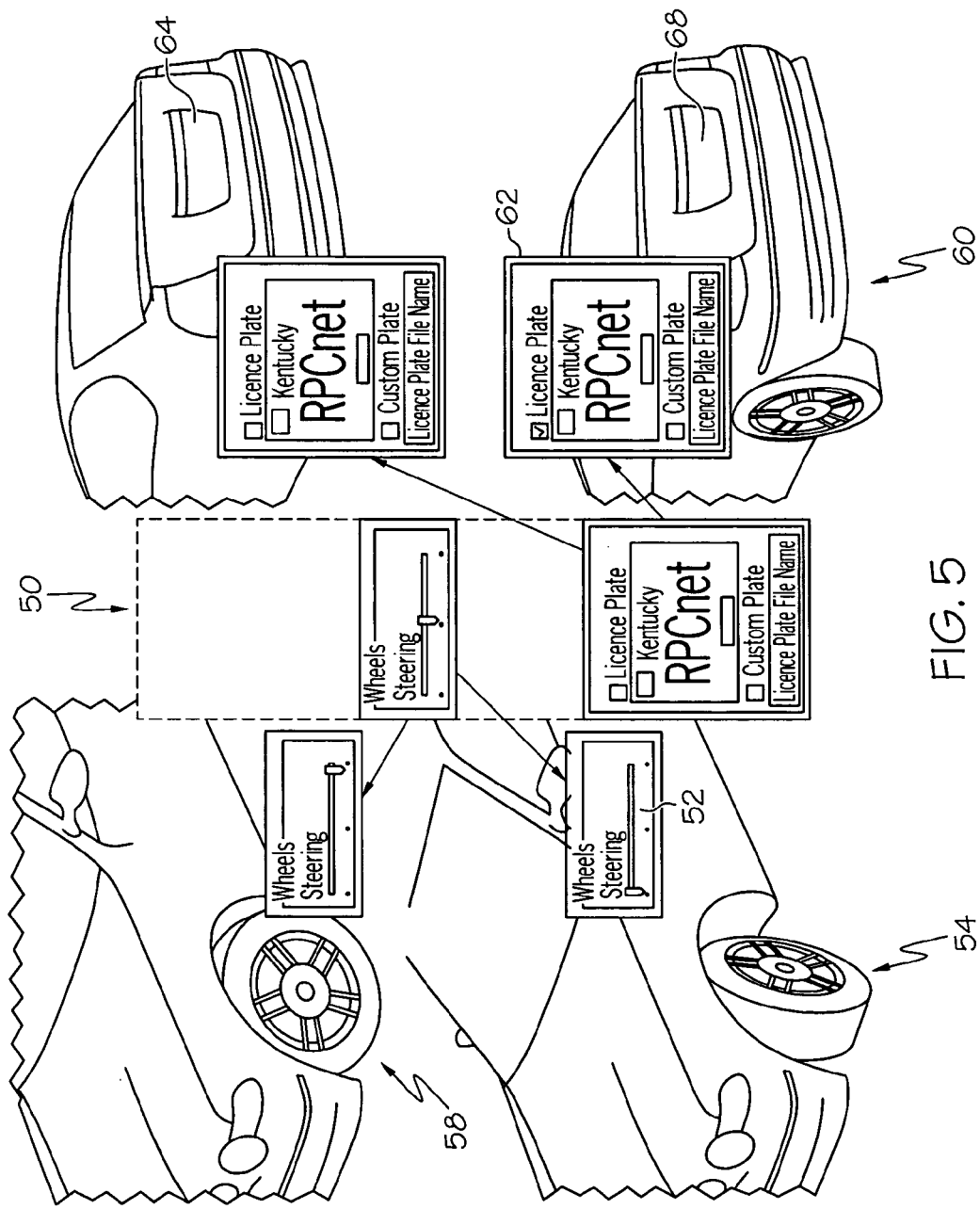
FIG. 5 is an on-screen representation of a compound GUI illustrating its use with automobiles.

Since the data manipulation functions are dependent on the content of the image to which they are operatively associated, it is preferable that the data manipulation functions be delivered to a host application associated with a specific content file. One such content file is known as a Rich Photorealistic Content (RPC) file that provides photo quality 3-D imagery that is highly detailed. Some of the RPC images are seen in FIGS. 3–5. Other RPC images may include people, shrubs, ornamental grasses, and flowers. "RPC" is a trademark of ArchVision, Inc. and is useful with image-based rendering (IBR) technology. RPC files rely on photo image data so that substantial richness of detail and quality of images are provided that far surpass the typical computer generated model.

RPC technology provides high quality image data combined with a minimal polygon geometry to create the illusion of three dimensions. By synthesizing image data as a camera moves through the scene, images effectively reproduce the appearance of a three dimensional object without relying on complex polygonal geometry. Placement of objects within the image is accomplished using a point and click method. An icon is first used to orient the RPC content within the geometry of the scene and, at render time, the RPC plug-in calculates the viewing angle of the RPC object routed to the virtual camera. The appropriate corresponding images are then synthesized, creating the illusion that a complete 3-D object exists in the scene.

As can be seen from the above, the standard RPC format makes it easy to place objects throughout any sort of image and have those objects appear with the richness and detail associated with RPC technology. Difficulty may arise when making the objects move, changing the orientation or moving parts within the object of one another. The present invention allows the RPC content to have data manipulation functions associated therewith even before a selected RPC image component is introduced within the host application. The data manipulation functions must be compatible with the host application. Operatively associating the data manipulation functions and, therefore, the menu-driven commands with the image content allows the RPC file to be sold to various entities using various host applications with the same data manipulation functions without specifically tailoring the data manipulation functions to a particular host application.

The present invention provides a method and system for rendering content-based controls to provide a content-specific graphic user interface, which is intuitive for users with respect to the content of the image. The present invention is discussed herein in terms of five embodiments, all similar in concept and utility. These include and will be discussed in greater detail hereinafter, a method, a system, a computer program carried on computer readable media, and computer readable medium carrying computer executable commands. In addition, the present invention is recited as a signal on a data wave, which is directed primarily to transmission of the present invention and RPC images operatively associated therewith over the Internet or other computer networking system.

With reference to FIG. 1, the RPC file is illustrated generally at 10 and includes, but is not limited to an API (Application Programming Interface) illustrated at 12 in operative association with a content-specific GUI, illustrated at 14. The host application is illustrated generally at 16. It should be noted and is discussed in various places throughout the application that the content-specific GUI is not necessarily physically reside with the API and the RPC content.

As discussed above, one of the embodiments of the present invention, and perhaps the most fundamental embodiment, is that of a method for using core functions of a host application to provide a content-specific graphical image manipulation interface and to provide manipulation of graphical content based on the attributes of that content.

It should be noted that the current version of the present invention requires human intervention to incorporate the present invention into the host application. This includes linking the data manipulation functions of the present invention with the core functions of the host application using the API and the host application. It should also be noted that is not a requirement for the present invention to be embodied literally on the same physical structure or graphic content.

As will be discussed in greater detail, one of the more useful aspects of the present invention is its ability to provide interactive catalogs with products. By providing the data manipulation functions for a first RPC graphic, subsequent and updated RPC graphics may be provided that make use of the same data manipulation functions as were provided originally. Accordingly, if the product in question were, for example, a chair and the data manipulation functions allow a person to adjust the chair in addition to, for example, choosing a color.

In this case, the data manipulation functions could be provided with the initial catalog file. Thereafter, updates can be provided which would include a new chair depicted in a RPC file responsive to the initially provided data manipulation functions. This is one example wherein the data manipulation functions would not be present in every RPC file.

The method for using the core functions of the host application includes steps of providing an API code segment for interaction with a host application. It is presumed that the user of the present invention will already have a host application or otherwise simultaneously acquire the host application such that the host application is not considered an element of present invention.

Then, a graphical content code segment is provided for interaction with the application program interface code segment to provide at least one graphical image. The next step is to use the application program interface and the host application to define a set of data manipulation functions to implement in the host application for selective image manipulation, the data manipulation functions being based on the core functions of the host application and the content of the graphical image. Each data manipulation function is assigned to one of a plurality of content-specific graphic user interface operations who thereby create a content-specific graphic user interface for display by the host application.

The step of defining the data manipulation functions includes storing the set of data manipulation functions with predetermined image components in operational association with the code segment defining a graphical image. It should also be noted that the image components also may include predetermined image subcomponents and a plurality of the subcomponents are used to form compound components.

Figure 2:
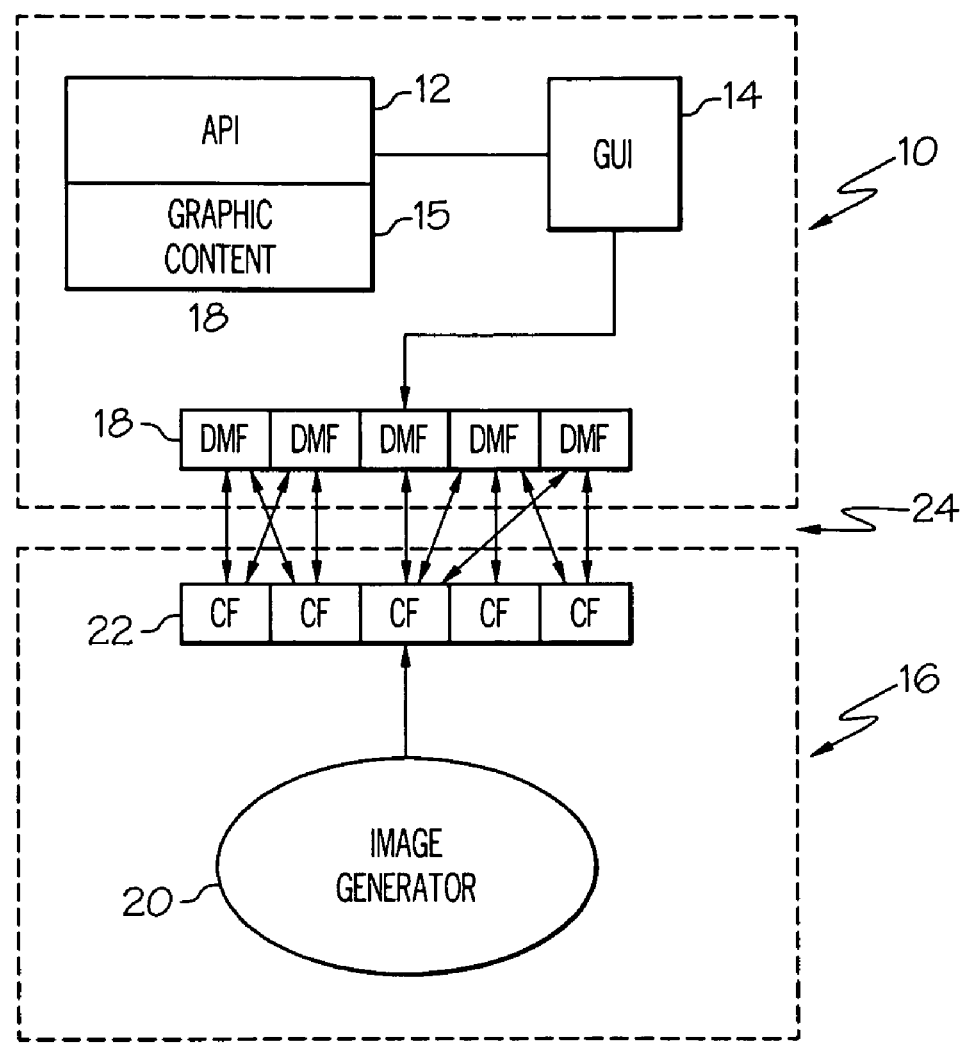
FIG. 2 is a diagrammatic representation of the GUI illustrated in FIG. 1 in greater detail.
Figure 3D:
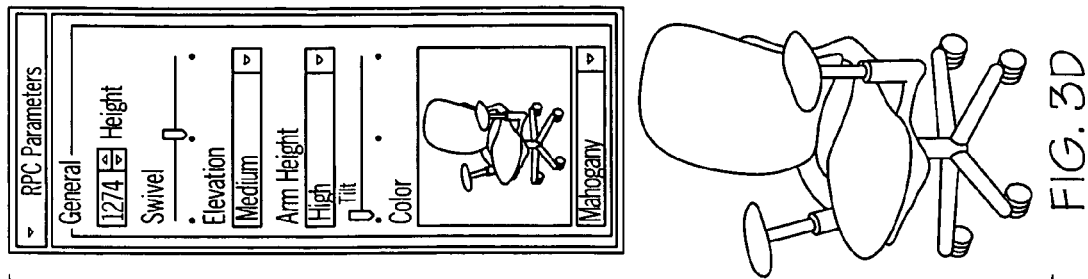
FIG. 3 is an on-screen representation of a compound GUI illustrating its use with chairs.
Figure 3D:
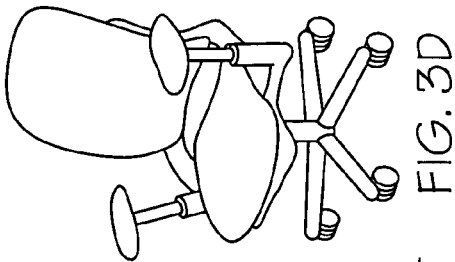
Figure 3C:
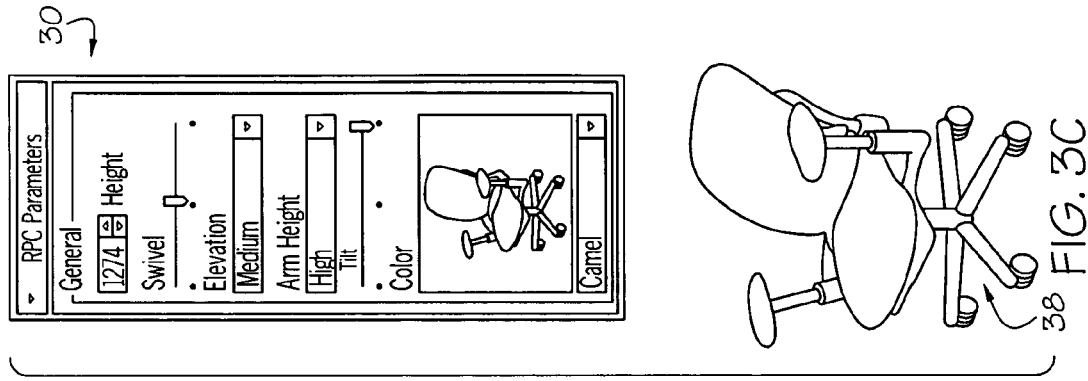
Figure 3C:
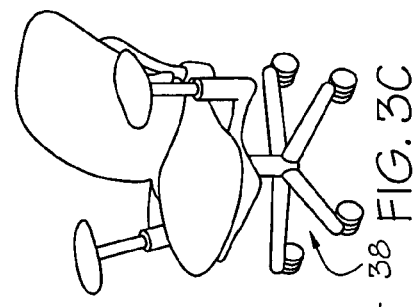
Figure 3B:
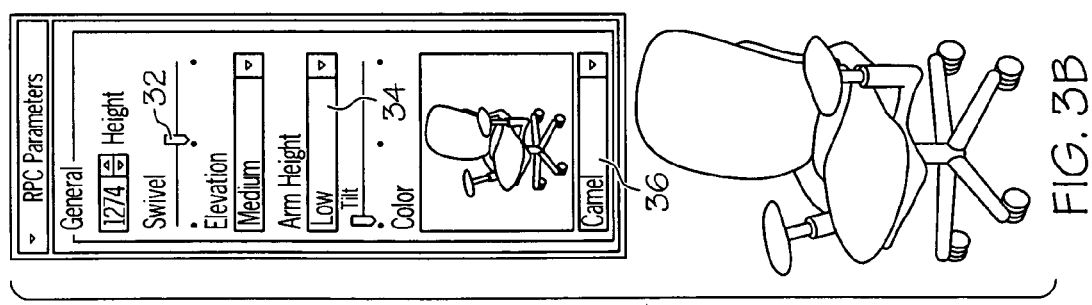
Figure 3B:
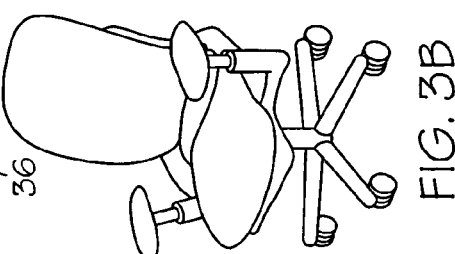
Figure 3A:
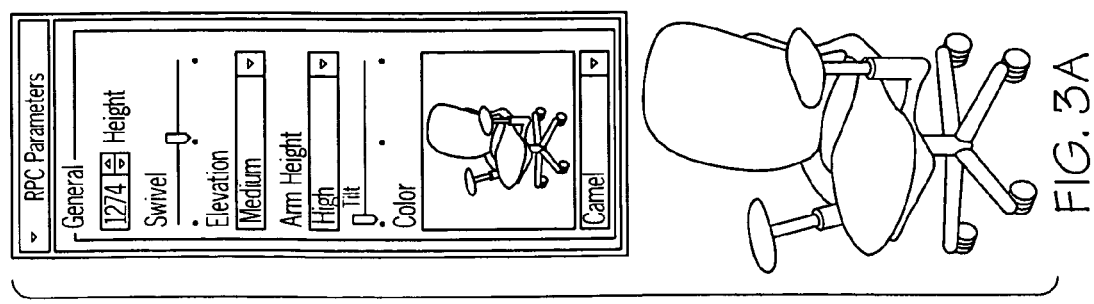
Figure 3A:
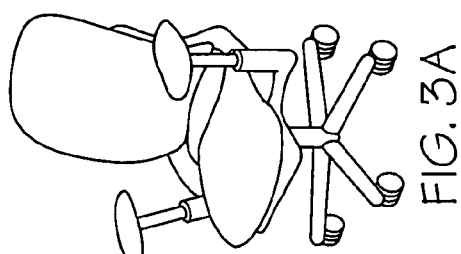
Figure 4D:
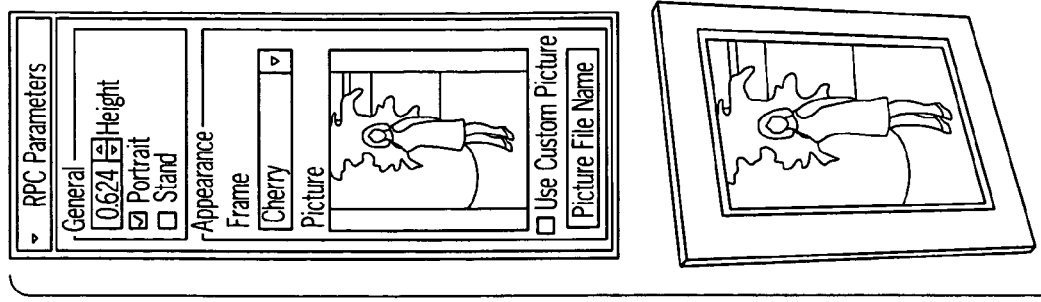
FIG. 4 is an on-screen representation of a compound GUI illustrating its use with picture frames.
Figure 4C:
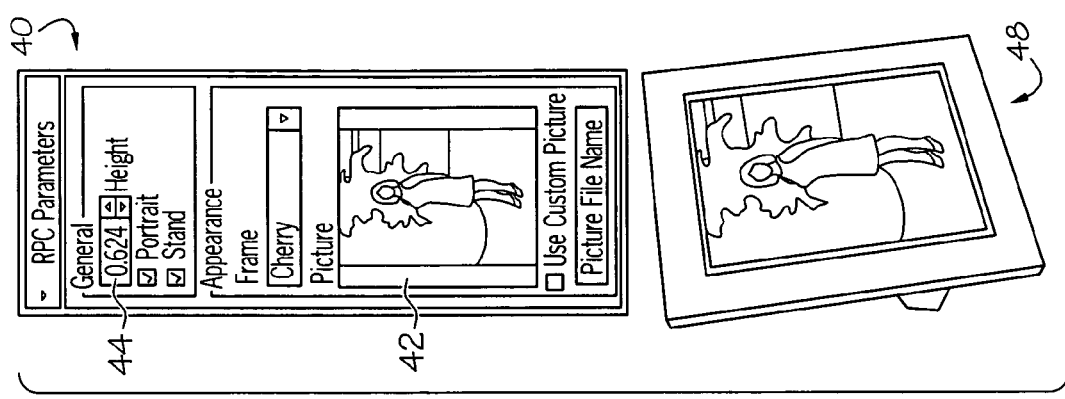
Figure 4B:
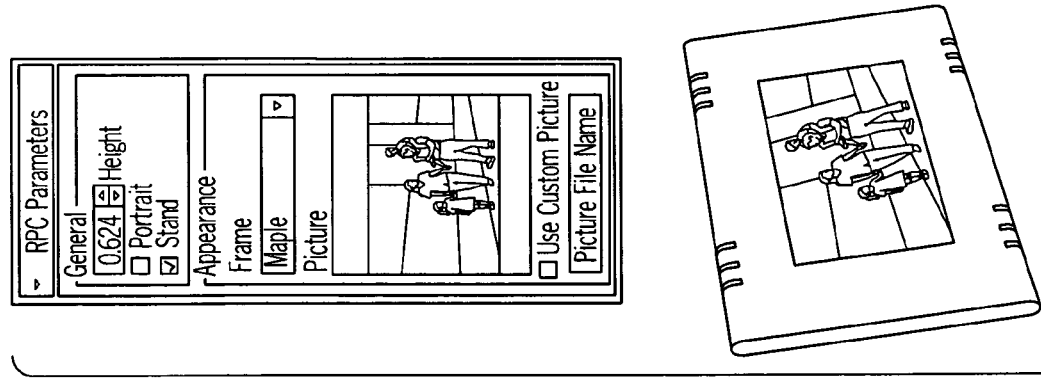
Figure 4A:
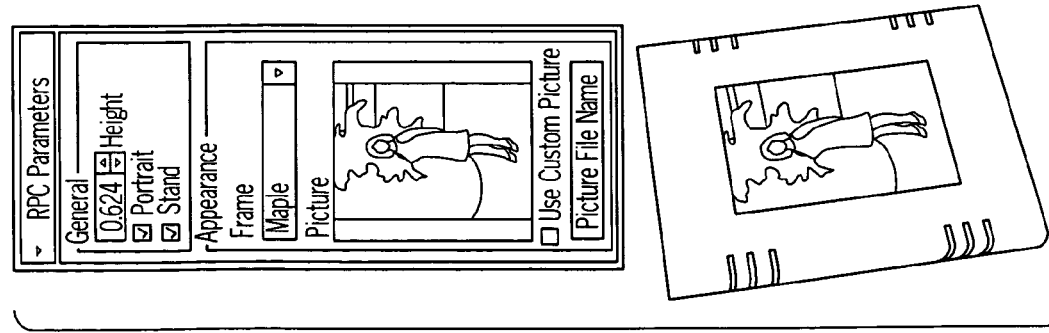

FIG. 2 presents a more detailed diagrammatic representation of the relationship between the RPC file 10 and the host application 16. According to the method, the API 12 and the GUI 14 interact so that the GUI 14 can provide data manipulation functions 18 based on the graphic content of the RPC image, illustrated as part of the API at 15. The host application 16 includes an image generator 20, which provides several core functions illustrated at 22 to control the image. The data manipulation functions 18 are coordinated with the core functions 22, the coordination being illustrated generally at 24 to provide a content-specific graphic user interface resident in the host application that is specific to the graphic content presented in the RPC file. Multiple GUI's 14 may be made, each for varying pieces of image content, independent of the core functions 22. When the RPC image content is applied within the image generator 20, a set of control icons are presented that are generated from content-specific GUI definitions. The user can then manipulate those content-specific GUI control icons to cause low-level actions to occur to the image content at the core functions 22. Every RPC image in a scene has its own GUI. For example, if two of the same chairs appear in a scene, a user would most likely see the same interface presented when manipulating each but they would have different interfaces.

The foregoing outlines the fundamental method steps that a software engineer would apply to define code segments therefor arranged in a logical and efficient manner to provide the functionality of the present invention. One manifestation of these code segments is in a computer system for providing a content-specific graphic user interface that includes at least one computer preprogrammed with a plurality of code segments for rendering a user interface having at least one graphic manipulation icon. The icon is operatively associated with at least one attribute of a graphic image for manipulation of at least one attribute by the user.

Such a preprogrammed computer system could provide a display of the graphic images and the ability to control those images using predetermined graphic manipulation icon or icons, as seen in FIGS. 3–5. With reference to FIG. 3, chairs 38, as discussed above are provided in various colors and styles and a compound GUI icon 30 will allow a user having access to the RPC files to use a swivel slider control 32 to swivel a chair, raise or lower its height 34 and change its color 36. It should be noted that the high-level functions presented to the end user are being translated into a series of low-level functions, the core functions 22, thereby freeing the end-user from having to manipulate the image content using the low-level controls and freeing the host application developer from having to translate the high-level functions into their low-level language.

Another example of the present invention at work in retail sales is provided in FIG. 4 wherein picture frames 48 are provided with another compound GUI icon 40 that includes a height control 44 and a control 42 that allows the user to insert their own photograph to enhance the users' ability to choose a correct frame 48.

Another example is seen in FIG. 5 wherein an automobile 60 can be positioned within, for example, an architectural application and the wheels steered right 58 or left 54 using a slider 52 labeled "steering." Such intuitive operation is one of the features of the present invention. Other image attribute manipulation could include opening and closing doors, the hood and the truck. As illustrated in FIG. 5 a license plate 62 may be added to a vehicle 60 resulting in the license plate being properly fitted, as illustrated at 64 and 68.

It should be noted that the three examples given are in no way limiting the present invention, but are providing for illustrative purposes and to convey the variety of functions the content-specific graphic user interface of the present invention can provide. As illustrated in FIG. 5, not only will the interface provide steering control and controls for moving objects within the image, additions to the image may be provided in a proper location. This is illustrated in FIG. 5 with the license plate 62 being inserted in the proper place 68 on the vehicle 60. In addition, the picture frame in FIG. 4 also includes the insertion of an image subcomponent within a predetermined area, i.e. the picture frame 48 provided by the graphic content.

Returning to the catalog example, one of the ways catalog files may be updated is using the Internet. It is likely that the catalog user will download or otherwise obtain the necessary software to produce the catalog and the movable chairs with features. Updates could be available for downloading using the Internet or e-mailed regularly. Therefore, the present invention may be described as a computer data signal embodied in a carrier wave including computer-executable instructions for rendering a user interface having at least one graphic manipulation icon. The icon, as before, is operatively associated with at least one attribute of the graphic image for manipulation of the attribute by the user. The term "attribute" refers herein to physical features of the objects depicted in the image files, such as the seat back of a chair, or the tire and wheels of an automobile.

Since the computer system is configured for executing predetermined code segments in a logical, efficient manner to produce graphic images associated with the present invention, the present invention may also be described as a computer readable media storing computer-executable instructions to provide a content-specific graphic user interface as described above.

Finally, the present invention may be manifest as a computer program embodied on a computer readable media for providing a content-specific graphic user interface. This program could exist on discs, tapes or any computer readable media. It is foreseeable that the program, as pre-arranged data could exist on any medium currently existing or that may be developed in the future.

As discussed above, the present invention may appear in several forms, but the fundamental aspects of the invention remain the same. Essentially, the method steps are arranged into computer readable code segments, which provide executable instructions to carry out the functions of the present invention. In order to transmit examples of the application over the Internet, the invention may be reduced to a modulated carrier wave having the code segments encoded therein. Further, the program may appear on any number computer readable media such as discs or tapes and the invention may reside within a computer system preprogrammed to carry out the method steps of the present invention.

By the above, the present invention provides substantial timesavings for computer users by providing the ability to manipulate attributes of a graphic image using a content-specific control interface.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof

We claim:

1. A computer program embodied on a computer-readable media for providing a content-specific graphic user interface comprising:

a plurality of data segments stored together, said data segments defining both a specific three-dimensional graphical content and at least one custom graphical manipulation function stored with the specific graphical content, wherein the custom graphical manipulation function is configured for rendering a user interface in any of a plurality of host applications in which a graphical image can be used, said at least one custom graphic manipulation function being operatively associated with at least one attribute of the graphic image for manipulation of said at least one attribute by a user, wherein the data segments are configured such that the selection of the custom graphic manipulation function by the user will cause a series of core graphic manipulation functions to be automatically applied to the graphic content such that a custom type of graphic manipulation specific to the content can be applied to the graphical content, wherein the core graphic manipulation functions comprise at least one of a transform function and a material properties function, including at least one of a move, rotate, scaling, texture, color, intensity, and opacity function.

2. A computer program according to claim 1 further comprising a code segment defining an application program interface configured to implement the graphic manipulation function in the host application for selective image manipulation, said graphic manipulation function being based on the core functions of the host application and the graphical image content.

3. A computer program according to claim 1 wherein said graphic manipulation function corresponds with a series of content-specific graphic user interface functions, configured to create a compound graphic user interface to be displayed within a host application.

4. A computer program embodied on a computer-readable media for providing a content-specific graphic user interface comprising:
  a code segment defining graphical content for use by a host application to display a predetermined graphical image;
  a code segment defining an application program interface for use in forming a set of data manipulation functions to implement in the host application for selective image manipulation, said data manipulation functions being based on the core functions of the host application and the graphical image content;
  a code segment defining functions for custom manipulation of the graphical content to alter the appearance of the graphic image displayed on a screen according to actions specifically configured for the graphical content, thereby forming data manipulation functions, said data manipulation functions being based on and stored along with the graphical content and implemented using said core functions; and
  a code segment cooperative with an input device to receive an input for image data manipulation, and to cause said code segment defining graphical content to apply said data manipulation functions to manipulate a graphical image on a display through the host application with said data manipulation functions using said core functions and the host application, wherein the core functions comprise at least one of a transform function and a material properties function, including at least one of a move, rotate, scaling, texture, color, intensity, and opacity function.

5. A computer program according to claim 4 wherein said data manipulation functions are defined based on the core functions and stored with predetermined image components in operative association with said content code segment.

6. A computer program according to claim 5 wherein said predetermined image components also include predetermined image sub-components and a plurality of said sub-components are used to form compound image components.

7. A computer program according to claim 4 wherein said data manipulation functions are assigned to one of a series of content-specific graphic user interface functions, thereby creating a compound graphic user interface to be displayed within a host application.

8. A computer readable medium having stored thereon data comprising:
  computer-executable instructions for rendering a graphic image and a user interface corresponding with graphical image content for the image and having at least one graphic manipulation icon, said at least one graphic manipulation icon being operatively associated with at least one custom attribute of the graphical image content for manipulation of said at least one attribute by a user through use of a core graphic manipulation, wherein the core function comprises at least one of a transform function and a material properties function, including at least one of a move, rotate, scaling, texture, color, intensity, and opacity function.

9. A computer readable medium according to claim 8 wherein said computer-executable instructions include a code segment defining graphical content for use by a host application to display a predetermined graphical image.

10. A computer readable medium according to claim 9 wherein said computer-executable instructions further include a code segment defining an application program interface for use in forming a set of data manipulation functions to implement in the host application for selective image manipulation, said data manipulation functions being based on the core functions of the host application and the graphical image content, wherein the core functions comprise at least one of a transform function and a material properties function, including at least one of a move, rotate, scaling, texture, color, intensity, and opacity function.

11. A computer readable medium according to claim 10 wherein said computer-executable instructions include a code segment defining functions for data manipulation of the graphical image content to alter the appearance of the graphic image displayed on a screen, thereby forming data manipulation functions, said data manipulation functions being based on the graphical image content and implemented using said core instructions.

12. A computer readable medium according to claim 11 wherein said computer-executable instructions include a code segment cooperative with an input device to receive an input for image manipulation, and to cause said content code segment to apply said data manipulation functions to manipulate a graphical image on a display through the host application with said data manipulation functions using the core functions and the host application.

13. A computer readable medium according to claim 11 wherein said data manipulation functions are defined based on the core functions and stored with predetermined components in operative association with said code segment defining graphical content.

14. A computer readable medium according to claim 13 wherein said predetermined components also include predetermined image sub-components and a plurality of said sub-components are used to form compound components.

15. A computer readable medium according to claim 13 wherein said data manipulation functions are assigned to one of a series of content-specific graphic user interface functions, thereby creating a compound graphic user interface to be displayed within a host application.

16. A computer readable medium having stored thereon data comprising:
  a code segment defining graphical content for use by a host application to display a predetermined graphical image;
  a code segment defining an application program interface for use in forming a set of data manipulation functions to implement in the host application for selective image data manipulation, said data manipulation functions being based on the core functions of the host application and the graphical content;
  a code segment defining functions for data manipulation of the graphical content to alter the appearance of the graphic image displayed on a screen, thereby forming data manipulation functions, said data manipulation functions being based on and stored along with the graphical content and implemented using said core functions; and
  a code segment cooperative with an input device to receive an input for image data manipulation, and to cause said code segment defining graphical content to apply said data manipulation functions to manipulate a graphical image on a display through the host application with said data manipulation functions using said core functions and the host application, wherein the core functions comprise at least one of a transform function and a material properties function, including at least one of a move, rotate, scaling, texture, color, intensity, and opacity function.

17. A computer readable medium according to claim 16 wherein said data manipulation functions are defined based on the core functions and stored with predetermined image components in association with said code segment defining graphical content.

18. A computer readable medium according to claim 16 wherein said predetermined components also include predetermined sub-components and a plurality of said sub-components are used to form compound components.

19. A computer readable medium according to claim 16 wherein said data manipulation functions are assigned to one of a series of content-specific graphic user interface functions, thereby creating a compound graphic user interface to be displayed within a host application.

20. A computer-readable media storing computer-executable instructions for providing a content-specific graphic user interface computer application comprising:
    computer-executable instructions for rendering a user interface having at least one graphic manipulation icon, said at least one graphic manipulation icon being operatively associated with at least one attribute of a specific graphic image for manipulation of said at least one attribute by a user.

21. A computer-readable media according to claim 20 wherein said computer-executable instructions include a code segment defining graphical content for use by a host application to display a predetermined graphical image.

22. A computer-readable media according to claim 20 wherein said computer-executable instructions further include a code segment defining an application program interface for use in forming a set of data manipulation functions to implement in the host application for selective image manipulation, said data manipulation functions being based on the core functions of the host application and the graphical image content.

23. A computer-readable media according to claim 22 wherein said computer-executable instructions include a code segment defining functions for data manipulation of the graphical content to alter the appearance of the graphic image displayed on a screen, thereby forming data manipulation functions, said data manipulation functions being based on the graphical image content and implemented using said core instructions.

24. A computer-readable media according to claim 23 wherein said computer-executable instructions include a code segment cooperative with an input device to receive an input for image manipulation, and to cause said content code segment to apply said data manipulation functions to manipulate a graphical image on a display through the host application with said data manipulation functions using the core functions and the host application.

25. A computer-readable media according to claim 22 wherein said data manipulation functions are defined based on the core functions and stored with predetermined image components in association with said code segment defining graphical content.

26. A computer-readable media according to claim 25 wherein said predetermined image components also include predetermined image sub-components and a plurality of said sub-components is used to form compound image components.

27. A computer-readable media according to claim 22 wherein said data manipulation functions are assigned to one of a series of content-specific graphic user interface functions, thereby creating a compound graphic user interface to be displayed within a host application.

28. A computer-readable media storing computer-executable instructions for providing a content-specific graphic user interface computer application comprising:
    a data segment defining specific graphical content for use by a host application to display a predetermined graphical image;
    a code segment defining an application program interface for use in forming a set of data manipulation functions to implement in the host application for selective data manipulation, said data manipulation functions being based on the core functions of the host application and the specific graphical content;
    a code segment defining functions for data manipulation of the specific graphical content to alter the appearance of the content displayed on a screen, thereby forming data manipulation functions, said data manipulation functions being based on the specific graphical content and implemented using said core functions; and
    a code segment cooperative with an input device to receive an input for data manipulation, and to cause said data segment defining content to apply said data manipulation functions to manipulate a display of the content on a screen through the host application with said data manipulation functions using said core functions and the host application, wherein the core functions comprise at least one of a transform function and a material properties function, including at least one of a move, rotate, scaling, texture, color, intensity, and opacity function.

29. A method for using core functions of a host application to provide a content-specific graphical image manipulation interface comprising steps of:
    providing an application program interface code segment for interaction with a host application;
    providing a graphical content segment for interaction with the application program interface code segment and to provide at least one graphical element;
    using said application program interface code segment to form a set of data manipulation functions to implement in the host application for selective data manipulation, the data manipulation functions being based on the core functions of the host application and the specific content, wherein the core functions comprise at least one of a transform function and a material properties function, including at least one of a move, rotate, scaling, texture, color, intensity, and opacity function; and
    assigning each function to one of a plurality of content-specific graphic user interface operations thereby creating a content-specific graphic user interface for display by the host application.

30. A method for using core functions from a host application to provide a content-specific graphical image data manipulation interface according to claim 29 wherein said step of defining a set of data manipulation functions includes storing said set of data manipulation functions with predetermined components in association with said code segment defining graphical content.

31. A method for using core functions from a host application to provide a content-specific graphical image manipulation interface according to claim 29 wherein said step of defining a set of data manipulation functions includes storing said set of data manipulation functions wherein said predetermined components also include predetermined image sub-components and a plurality of said sub-components are used to form compound components.

32. A computer system for providing a content-specific graphic user interface comprising:
    at least one computer preprogrammed with a plurality of code segments for rendering a user interface having at least one graphic manipulation icon, said at least one graphic manipulation icon being operatively associated with at least one custom attribute of a graphic image for manipulation of said at least one attribute by a user.

33. A computer system according to claim 32 wherein said at least one computer is preprogrammed with a code segment defining graphical content for use by a host application to display a predetermined graphical image.

34. A computer system according to claim 32 wherein said at least one computer is preprogrammed with a code segment defining an application program interface to form a set of core functions to implement in the host application for selective image manipulation, said core functions being based on the capabilities of the host application.

35. A computer system according to claim 34 wherein said at least one computer is preprogrammed with a code segment defining functions for data manipulation of the graphical content to alter the appearance of the graphic image displayed on a screen, thereby forming data manipulation functions, said data manipulation functions being based on the graphical image content and implemented using said core instructions.

36. A computer system according to claim 35 wherein said at least one computer is preprogrammed with a code segment cooperative with an input device to receive an input for image manipulation, and to cause said content code segment to apply said data manipulation functions to manipulate a graphical image on a display through the host application with said data manipulation functions using the core functions and the host application.

37. A computer system according to claim 35 wherein said at least one computer is preprogrammed to define data manipulation functions based on the core functions and store said data manipulation functions with predetermined image components in association with said code segment defining graphical content.

38. A computer system according to claim 37 wherein said at least one computer storing the predetermined image components also stores predetermined image sub-components and uses said plurality of said sub-components to form compound image components.

39. A computer system according to claim 35 wherein said at least one computer is preprogrammed to assign said data manipulation functions to one of a series of content-specific graphic user interface functions, thereby creating a compound graphic user interface to be displayed within a host application.

40. A computer system for providing a content-specific graphic user interface comprising:

at least one computer preprogrammed with:

(a) a code segment defining graphical content for use by a host application to display a predetermined graphical image;

(b) a code segment defining an application program interface for use in forming a set of data manipulation functions to implement in the host application for selective image manipulation, said data manipulation functions being based on the core functions of the host application and the graphical image content;

(c) a code segment defining functions for data manipulation of the graphical content to alter the appearance of the graphic image displayed on a screen, thereby forming data manipulation functions, said data manipulation functions being based on the graphical image content and implemented using said core functions; and (d) a code segment cooperative with an input device to receive an input for image data manipulation, and to cause said code segment defining graphical content to apply said data manipulation functions to manipulate a graphical image on a display through the host application with said data manipulation functions using said core functions and the host application, wherein the core functions comprise at least one of a transform function and a material properties function, including at least one of a move, rotate, scaling, texture, color, intensity, and opacity function.

* * * * *

UNITED STATES PATENT AND TRADEMARK OFFICE
CERTIFICATE OF CORRECTION

PATENT NO. : 7,213,229 B2 Page 1 of 1
APPLICATION NO. : 10/376175
DATED : May 1, 2007
INVENTOR(S) : Randall Stevens et al.

It is certified that error appears in the above-identified patent and that said Letters Patent is hereby corrected as shown below:

Claim 22, column 13, lines 32-33 - change "application and the graphical" to

--application and graphical--.

Signed and Sealed this

Thirty-first Day of July, 2007

JON W. DUDAS
*Director of the United States Patent and Trademark Office*